US012658080B2

(12) United States Patent
Lee et al.

(10) Patent No.: US 12,658,080 B2
(45) Date of Patent: Jun. 16, 2026

(54) SPECTRUM-EXTENDED ROAD ELECTRIC SIGN, ROAD ELECTRIC SIGN CONTROL SYSTEM AND TRAFFIC INFORMATION ACQUISITION DEVICE USING THE SAME

(71) Applicant: KOREA INSTITUTE OF CIVIL ENGINEERING AND BUILDING TECHNOLOGY, Goyang-si (KR)

(72) Inventors: Suk-Ki Lee, Gimpo-si (KR); Yongseok Kim, Goyang-si (KR); Won Il Park, Bucheon-si (KR); Ki-Soo Park, Paju-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 330 days.

(21) Appl. No.: 18/494,489

(22) Filed: Oct. 25, 2023

(65) Prior Publication Data

US 2024/0304122 A1 Sep. 12, 2024

(30) Foreign Application Priority Data

Mar. 10, 2023 (KR) ........................ 10-2023-0031993

(51) Int. Cl.
*G09F 13/22* (2006.01)

(52) U.S. Cl.
CPC ........ *G09F 13/22* (2013.01); *G09F 2013/222* (2013.01)

(58) Field of Classification Search
CPC ........................... G09F 13/22; G09F 2013/222
See application file for complete search history.

(56) References Cited

U.S. PATENT DOCUMENTS

| | | | | |
|---|---|---|---|---|
| 9,734,744 B1 * | 8/2017 | McGie | G09G 3/14 | |
| 2007/0200730 A1 * | 8/2007 | Kang | G08G 1/095 | 340/815.45 |
| 2008/0244942 A1 * | 10/2008 | Patel | G09F 9/33 | 40/611.05 |

(Continued)

FOREIGN PATENT DOCUMENTS

| | | |
|---|---|---|
| JP | 2015-055112 A | 3/2015 |
| JP | 2022-104905 A | 7/2022 |

(Continued)

*Primary Examiner* — Gary C Hoge
(74) *Attorney, Agent, or Firm* — Studebaker Brackett PLLC

(57) ABSTRACT

The present invention relates to a spectrum-expanded road electric sign, a road electric sign control system, and a traffic information acquisition device using the same. To this end, the spectrum-expanded road electric sign of the present invention comprises: a housing provided with a substrate therein; a visible LED array including a plurality of visible LEDs repeatedly arranged on a substrate to allow various types of traffic information to be visually recognized by a driver; and an infrared LED array including a plurality of infrared LEDs repeatedly arranged adjacent to the respective visible LEDs. As a result, even in the case where the driver's visibility is not sufficiently guaranteed due to adverse weather conditions, infrared light in the non-visible light range is also emitted, making it possible to capture an infrared video by capturing infrared images.

5 Claims, 14 Drawing Sheets

(56) References Cited

U.S. PATENT DOCUMENTS

| | | | | |
|---|---|---|---|---|
| 2011/0227105 | A1* | 9/2011 | Hwu | H01L 25/0753 257/E33.059 |
| 2019/0347966 | A1* | 11/2019 | Lee | F21V 23/0464 |
| 2021/0218272 | A1* | 7/2021 | Lee | G09F 13/005 |

FOREIGN PATENT DOCUMENTS

| | | | |
|---|---|---|---|
| KR | 10-2017-0000245 | A | 1/2017 |
| KR | 10-2307889 | B1 | 10/2021 |
| KR | 10-2022-0094291 | A | 7/2022 |
| KR | 10-2022-0114440 | A | 8/2022 |

* cited by examiner

SPECTRUM-EXTENDED ROAD ELECTRIC SIGN, ROAD ELECTRIC SIGN CONTROL SYSTEM AND TRAFFIC INFORMATION ACQUISITION DEVICE USING THE SAME

CROSS-REFERENCE TO RELATED PATENT APPLICATION

This application claims the benefit of Korean Patent Application No. 10-2023-0031993, filed on Mar. 10, 2023, in the Korean Intellectual Property Office, the disclosure of which is incorporated herein in its entirety by reference.

BACKGROUND OF THE INVENTION

1. Field of the Invention

The present invention relates to a spectrum-expanded road electric sign, a road electric sign control system, and a traffic information acquisition device using the same, and more specifically, to a spectrum-expanded road electric sign comprising: a housing provided with a substrate therein; a visible LED array including a plurality of visible LEDs repeatedly arranged on the substrate to allow various types of traffic information to be visually recognized by a driver; and an infrared LED array including a plurality of infrared LEDs repeatedly arranged adjacent to the respective visible LEDs, a road electric sign control system, and a traffic information acquisition device using the same.

2. Description of the Related Art

Typically, on automobile-only roads such as highways, Variable Message Signs (VMSs) are installed for the purpose of improving the efficiency of traffic flow and the safety of traffic by providing drivers of passing vehicles with real-time traffic information on traffic conditions, road conditions, weather conditions, construction sites, traffic control due to accidents, etc.

The above-mentioned variable message signs provide the drivers with information in a visual form. Recently, with the widespread use of variable message signs equipped with LED lamps, it has gone beyond simple text and now displays various types of traffic information in symbolic shapes, images, and even dynamic videos.

However, these variable message signs, which deliver traffic information only in a visual form, have the limitation of reduced visibility during localized heavy rainfall, snowfall, or foggy conditions that obstruct the drivers' forward view. In other words, there is a limitation where their inherent functionality may not be effective in the event of emergencies such as sudden weather changes that require variable speeds, accidents that necessitate deceleration, etc.

In particular, with the recent development of Advanced Driver Assistant Systems (ADASs), which control the steering systems by means of cameras and sensors to perceive the surrounding environment, it is expected that the functionality of recognizing information provided by variable message signs by means of cameras and then controlling steering systems will be utilized. However, there is a drawback that, like regular drivers, the accuracy of information recognition by the cameras installed in the vehicles can be compromised in adverse weather conditions.

Furthermore, there has been another issue where, when the camera captures a variable message sign, the "flicker effect" may occur, which is not observable to the driver's naked eye, but leads to a decrease in the accuracy of image recognition. In other words, it is anticipated that the various types of traffic information provided by the variable message sign could be difficult to interpret due to distortion caused by the flicker effect.

Meanwhile, in the past, there have been proposals for aviation obstruction light systems that use infrared LEDs in addition to red LEDs in the event of adverse weather conditions to allow pilots wearing night vision goggles to identify the lights more effectively; however, their purpose was primarily for guiding flight paths and did not extend beyond that.

REFERENCES OF THE RELATED ART

Patent Document 1: Korean Patent Application Publication No.: 10-2022-0094291 (published on Jul. 6, 2022)

Patent Document 2: Korean Patent Application Publication No.: 10-2022-0114440 (published on Aug. 17, 2022)

SUMMARY OF THE INVENTION

The present invention has been made in an effort to solve the above-described problems associated with prior art, and an object of the present invention is to provide a spectrum-expanded road electric sign, a road electric sign control system, and a traffic information acquisition device using the same, which, even in the case where the driver's visibility is not sufficiently guaranteed due to adverse weather conditions, can acquire traffic information from an infrared image captured by emitting infrared light in the non-visible light range together, can selectively turn on the infrared light based on the visibility distance, allows for effective operation depending on the situation by adjusting the brightness of visible light or selectively turning on the infrared light based on a variable speed limit or deceleration distance, and allows for autonomous driving control by allowing the driving vehicle to recognize the infrared light to extract traffic information.

In order to achieve the above-described object, the present invention provides a spectrum-extended road electric sign 100 comprising: a housing 10 provided with a substrate therein; a visible LED array 20 including a plurality of visible LEDs 21 repeatedly arranged on the substrate and selectively turned on to allow various types of traffic information to be visually recognized by a driver; and an infrared LED array 30 including a plurality of infrared LEDs 31 repeatedly arranged on the substrate to be adjacent to the respective visible LEDs 21.

The respective infrared LEDs 31 of the infrared LED array 30 may be synchronized and turned on when adjacent visible LEDs 21 are turned on.

The visible LEDS 21 and the infrared LEDs 31 may be integrated into a single chip or lamp.

The road electric sign 100 may further comprise a cover lens 40 coupled to the housing 10 to cover the visible LED array 20 and the infrared LED array 30.

In order to achieve the above-described object, the present invention also provides a spectrum-extended road electric sign control system (VS) comprising: a road electric sign 100 including a visible LED array 20 including a plurality of visible LEDs 21 repeatedly arranged on a substrate and an infrared LED array 30 including a plurality of infrared LEDs 31 repeatedly arranged to be adjacent to the respective visible LEDs 21; a visibility distance measurement device 200 installed in the vicinity of the road electric sign 100 to measure a visibility distance of a road in real time; and a control device 300 that selectively turns on the visible LEDs 21 and the infrared LEDs 31 to display various types of traffic information on the road electric sign 100 using visibility distance information (Md) measured by the visibility distance measurement device 200.

The control device 300 may synchronize the infrared LED array 30 to be turned on only when the visibility distance information (Md) is less than a certain visibility distance.

The control device 300 may calculate an appropriate brightness (Lu) of the respective visible LEDs 21 using the visibility distance information (Md) and then control the visible LEDs 21 in real time.

The control device 300 may display a variable speed limit ($V_t$) for the relevant road on the road electric sign 100 when the visibility distance information (Md) is less than a certain visibility distance.

The control device 300 may calculate a deceleration distance (Rd) using a normal speed limit ($V_o$) and the variable speed limit ($V_t$) for the relevant road, and synchronize the infrared LED array 30 to be turned on only when the deceleration distance (Rd) is more than a certain distance.

In order to achieve the above-described object, the present invention also provides a traffic information acquisition device (A) for use of the spectrum-expanded road electric sign of the present invention to control a vehicle by identifying various types of traffic information displayed on the road electric sign 100 equipped with an infrared LED array 30, the traffic information acquisition device (A) comprising: an infrared image capturing unit 50 that captures an infrared image by recognizing infrared light from infrared LEDs 31 of the road electric sign 100; an area extraction unit 60 that identifies an electric sign area using the image captured by the infrared image capturing unit 50; a traffic information extraction unit 70 that extracts traffic information based on the electric sign area identified by the area extraction unit 60; and a driving control unit 80 that controls the driving of the vehicle based on the traffic information extracted by the traffic information extraction unit 70.

According to the spectrum-extended road electric sign, the road electric sign control system, and the traffic information acquisition device using the same of the present invention, since various types of traffic information are visually displayed to the driver by means of the visible LED array, and at the same time, the infrared LED array including a plurality of infrared LEDs repeatedly arranged adjacent to the respective visible LEDs is provided, it is possible to acquire traffic information from an infrared image captured by emitting infrared light in the non-visible light range together even in the case where the driver's visibility is not sufficiently guaranteed due to adverse weather conditions.

Moreover, the visible LED array and the infrared LED array are integrated into a single substrate, providing the advantage of being able to allow for structurally simplified production and to allow for installation using existing infrastructure.

Furthermore, the control device can provide traffic information as an effective means depending on weather conditions by selectively turning on the infrared LEDs using the visibility distance information measured by the visibility distance measurement device.

Depending on the embodiment, it is possible to provide high visibility to vehicle drivers by adjusting the brightness based on an appropriate brightness of the visible LEDs calculated from the visibility distance information.

In addition, it is possible to allow for effective operation depending on the situation by selectively turning on the infrared light based on a variable speed limit or deceleration distance only when it is difficult for the driving vehicle to recognize the visible light.

Additionally, the traffic information acquisition device mounted on the driving vehicle can recognize infrared light from the road electric signs to extract traffic information and then control the driving of the vehicle based on the extracted traffic information, allowing for autonomous driving control even in the case of adverse weather conditions.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the accompanying drawings.

The present invention has been made in an effort to provide traffic information to driving vehicles by utilizing infrared LEDs in the non-visible light range so as to solve the problem that conventional variable message signs that use only visible LEDs fail to ensure the driver's visibility or are not recognized by cameras of driving vehicles due to adverse weather conditions.

Meanwhile, the spectrum-extended road electric sign 100 of the present invention is defined to include not only a Variable Message Sign (VMS) that provides various types of traffic information in real time, but also a Variable speed limit Sign (VSLS) that provides information about variable speeds.

Figure 1:
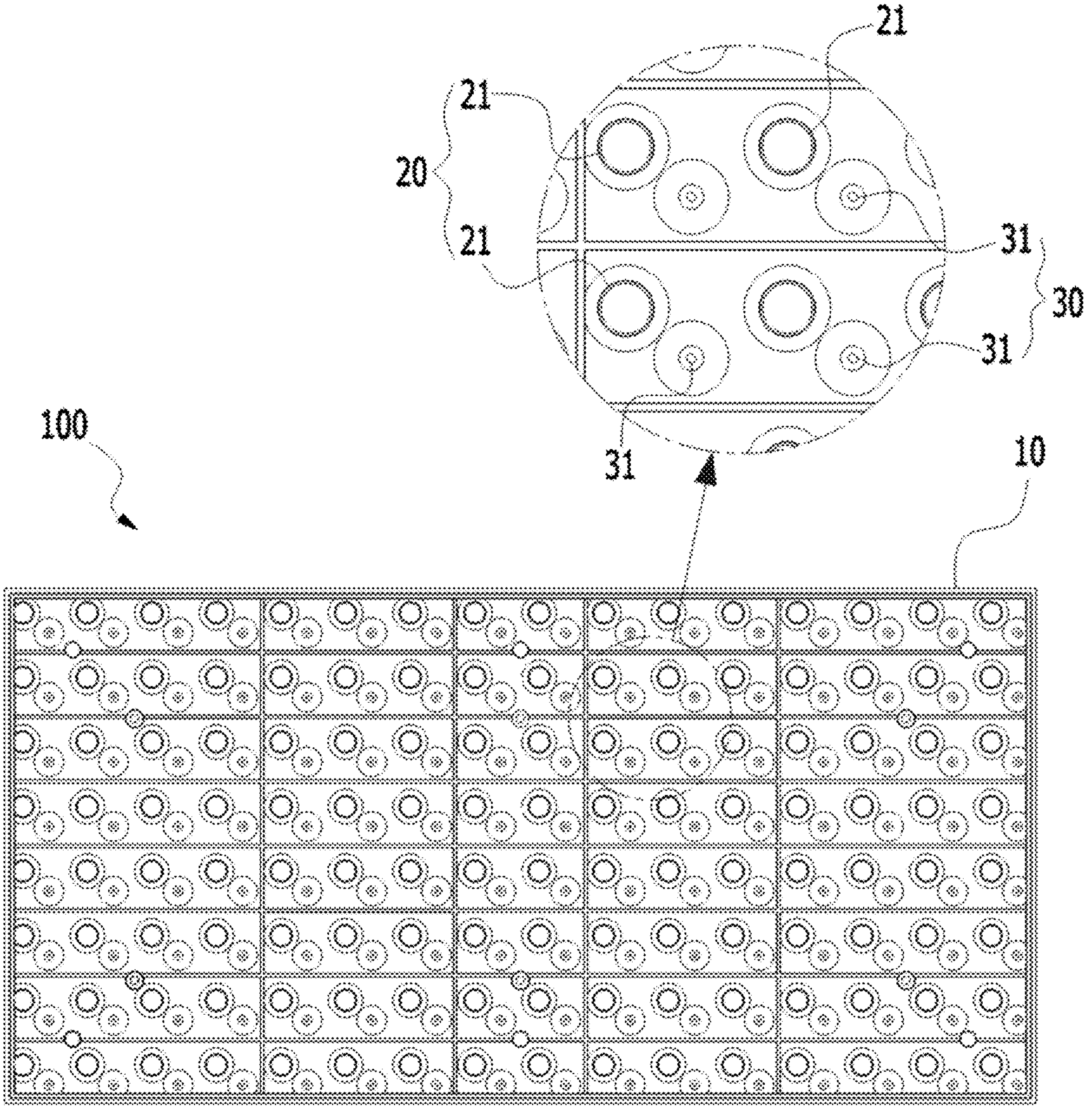
FIG. 1 is a front view illustrating a road electric sign according to one embodiment of the present invention.

First, as shown in FIG. 1, the spectrum-extended road electric sign 100 of the present invention may comprise a PCB substrate provided in a housing 10, and a visible LED array 20 and an infrared LED array 30 may be installed together on the substrate. The road electric sign 100 may be formed by combining a plurality of housings 10.

The visible LED array 20 may include a plurality of visible LEDs 21 repeatedly arranged on the substrate. Each visible LED 21 defines a single lamp or chip, and it may be a single-color LED as well as an LED that displays various colors.

The control device 300 can selectively turn on the respective visible LEDs 21 of the visible LED array 20 to create characters, figures, images or videos, thereby displaying various types of traffic information. As a result, the driver of the driving vehicle can visually recognize the traffic information displayed on the road electric sign 100, and the vehicle equipped with an image sensor can also recognize the traffic information using visible light.

Meanwhile, the spectrum-extended road electric sign 100 of the present invention is characterized in that a plurality of infrared LEDs 31 are repeatedly arranged to form the infrared LED array 30 and the respectively infrared LEDs 31 are arranged adjacent to the respective visible LEDs 21.

Each infrared LED 31 of the infrared LED array 30 may also be formed as a single lamp or chip, and as shown in FIG. 1, each infrared LED 31 can be formed to correspond to one adjacent visible LED 21. However, as long as the visible LEDs 21 and the infrareds LED 31 are arranged in a corresponding manner, they may be arranged in a 1:N or N:1 relationship (N is a natural number) depending on the output of the LED.

Moreover, the visible LED array 20 and the infrared LED array 30 are provided together on a single substrate, which allows for structurally simplified production and allows for installation using existing infrastructure, resulting in economic advantages.

Figure 2:
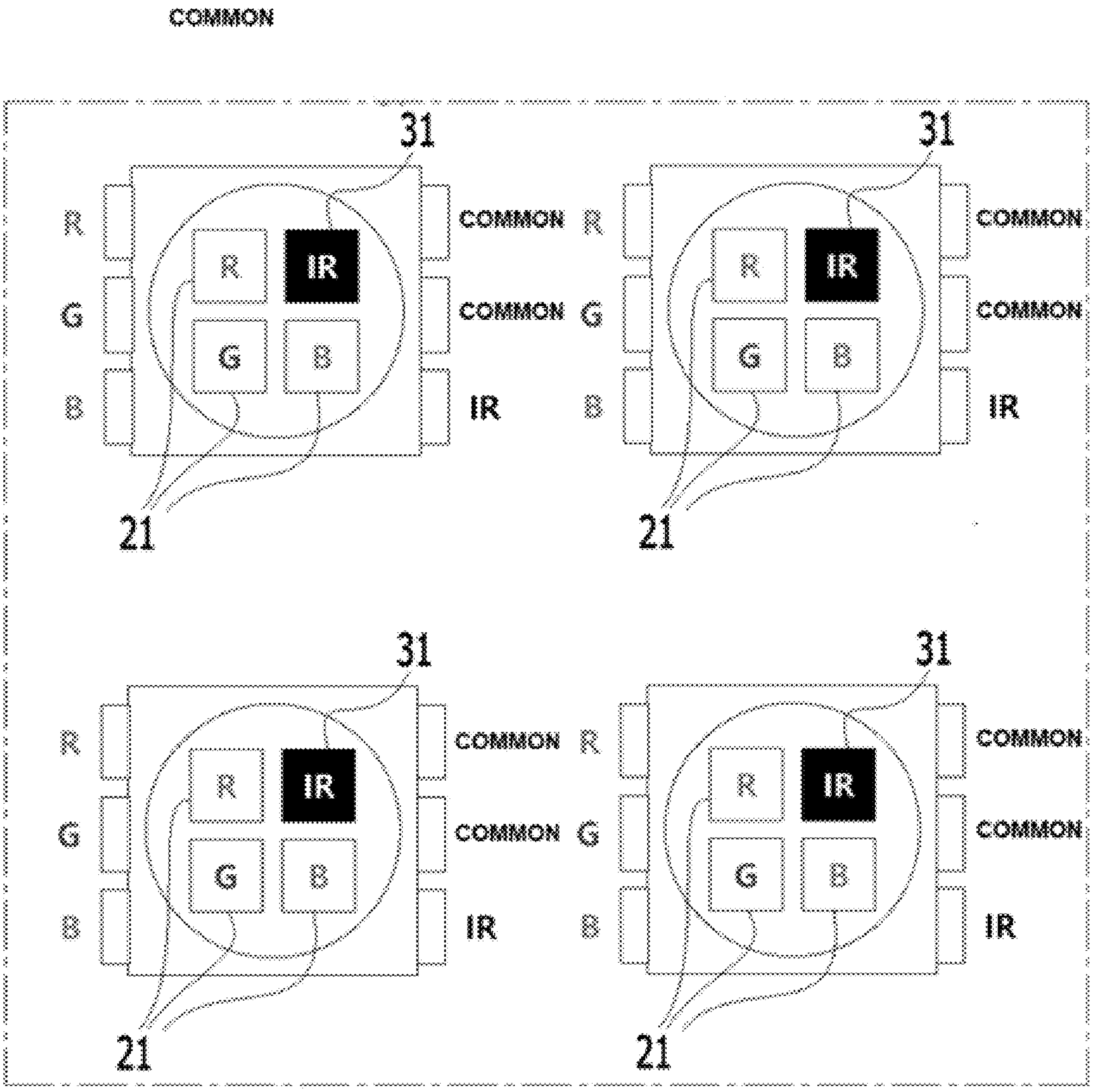
FIG. 2 is a front view illustrating LEDs according to another embodiment of the present invention.

In this case, each visible LED 21 and each infrared LED 31 may be formed as a lamp or chip, but depending on the embodiment, as shown in FIG. 2, the visible LEDs 21 and the infrared LEDs 31 may be integrated into a single chip or lamp, resulting in a structurally simplified form.

Meanwhile, the spectrum-extended road electric sign 100 of the present invention is technically characterized in that the respective infrared LEDs 31 of the infrared LED array 30 are synchronized and turned on when adjacent visible LEDs 21 are turned on. In other words, when the control device 300 selectively turns on the respective visible LEDs 21 of the visible LED array 20, the corresponding adjacent infrared LEDs 31 can also be turned on.

Figure 3A:
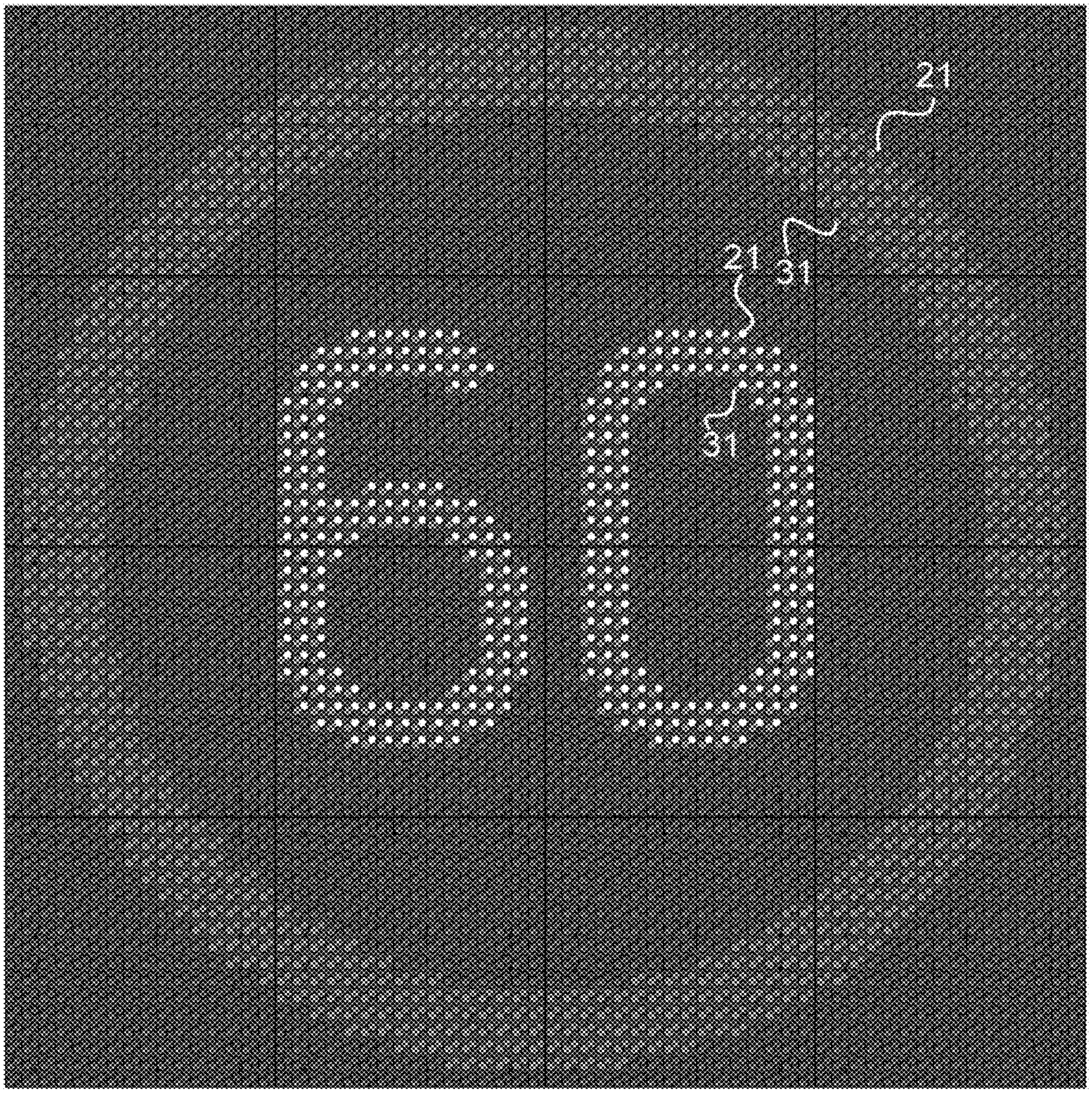
FIG. 3A is an image conceptually illustrating a road electric sign displaying variable speed information according to an embodiment of the present invention.
Figure 3B:
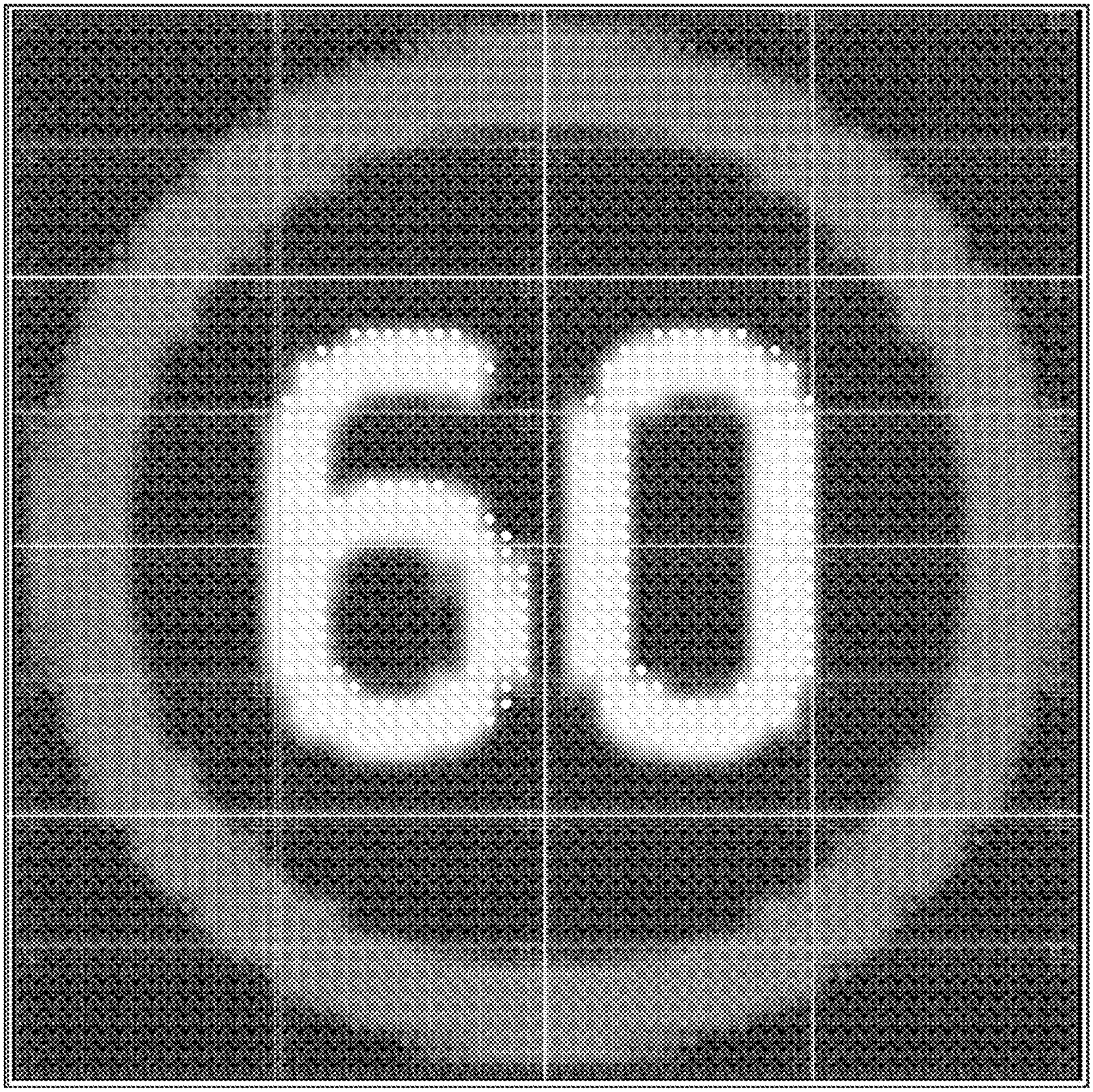
FIG. 3B is an image illustrating variable speed information which is displayed on the road electric sign according to an embodiment of the present invention and perceived by the naked eye.
Figure 3C:
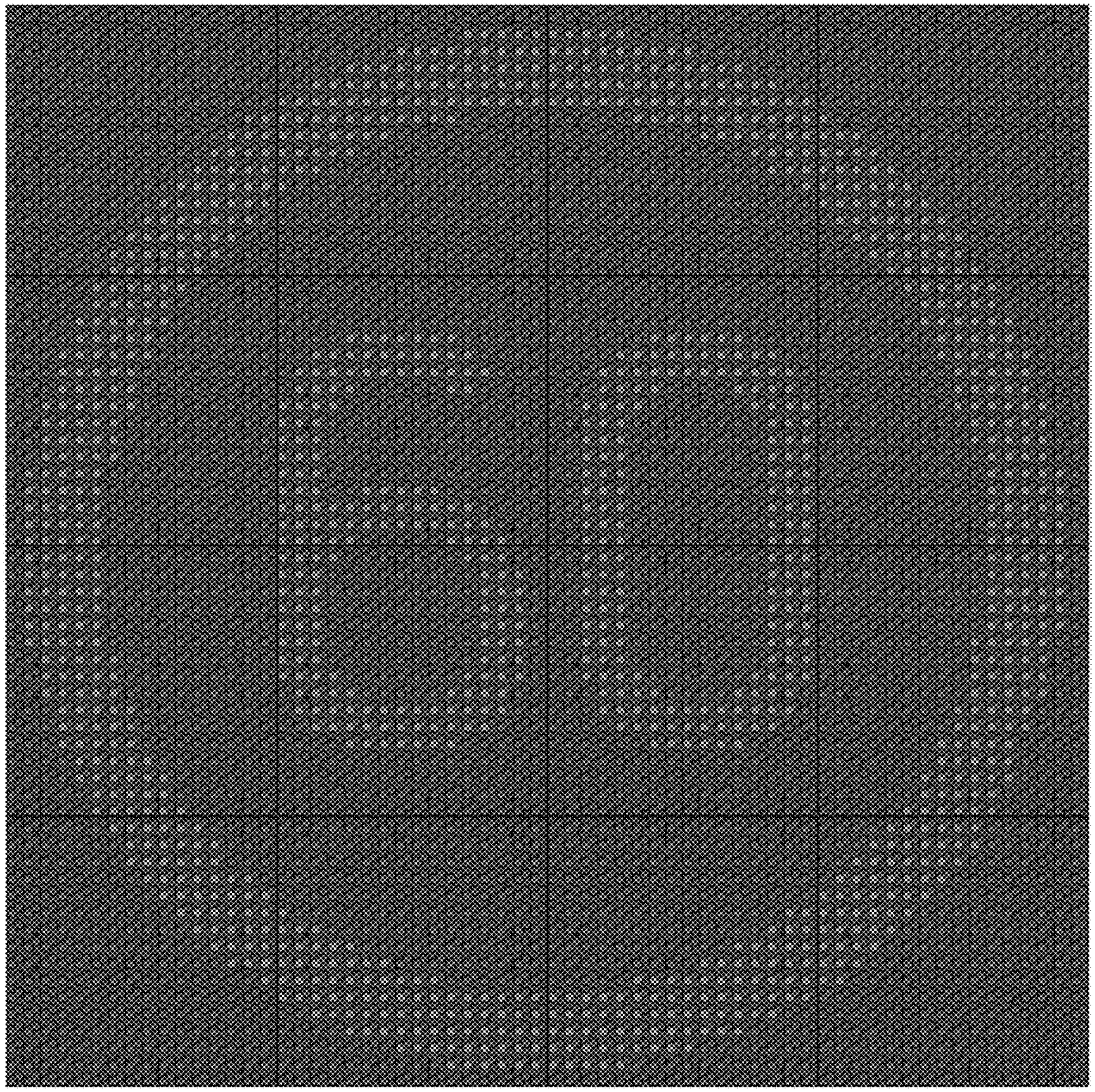
FIG. 3C is an image conceptually illustrating only an infrared region of variable speed information displayed on the road electric sign according to an embodiment of the present invention.

FIG. 3A shows a road electric sign displaying variable speed information according to an embodiment of the present invention, and it is conceptually shown that the visible LEDs 21 are turn on in red and white colors, and adjacent infrared LEDs 31 are also turned on. In reality, as perceived by the driver's naked eye, it would appear as shown in FIG. 3B, and if only the infrared region is conceptually represented, except for the visible light region, it would appear as shown in FIG. 3C.

According to the spectrum-extended road electric sign 100 of the present invention, even in the case where the driver's visibility is not sufficiently guaranteed due to adverse weather conditions, infrared light in the non-visible light range is also emitted, making it possible to capture an infrared video by capturing infrared images. As a result, the traffic information acquisition device (A), which will be described later, can provide the extracted traffic information to the driver through a display unit 90, and thus the driving control unit 80 can autonomously control the vehicle's operation based on the extracted traffic information.

Figure 4:
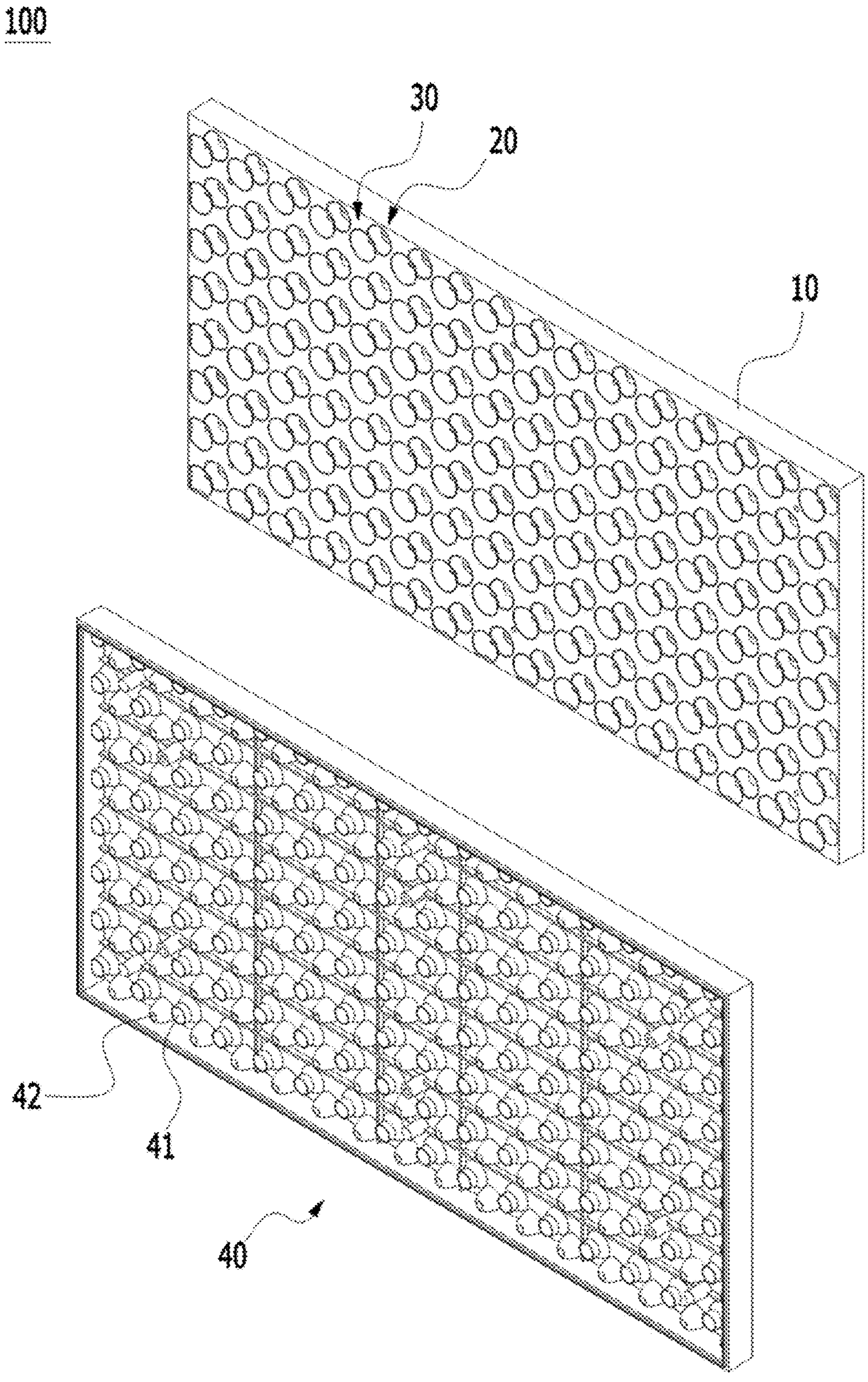
FIG. 4 is an exploded perspective view showing the road electric sign according to an embodiment of the present invention.

Moreover, as shown in FIG. 4, a cover lens 40 may be coupled to the front of the housing 10 of the road electric sign 100. The cover lens 40 is made of a material with excellent light transparency and may be formed integrally to cover both the visible LED array 20 and the infrared LED array 30. In this case, lens sleeves 41 and 42 may be provide to accommodate each visible LED 21 and each infrared LED 31 that constitute the visible LED array 20 and the infrared LED array 30.

Hereinafter, a specific embodiment of controlling the above-described road electric sign 100 will be described in more detail with a focus on the spectrum-extended road electric sign control system (VS) of the present invention.

Figure 5:
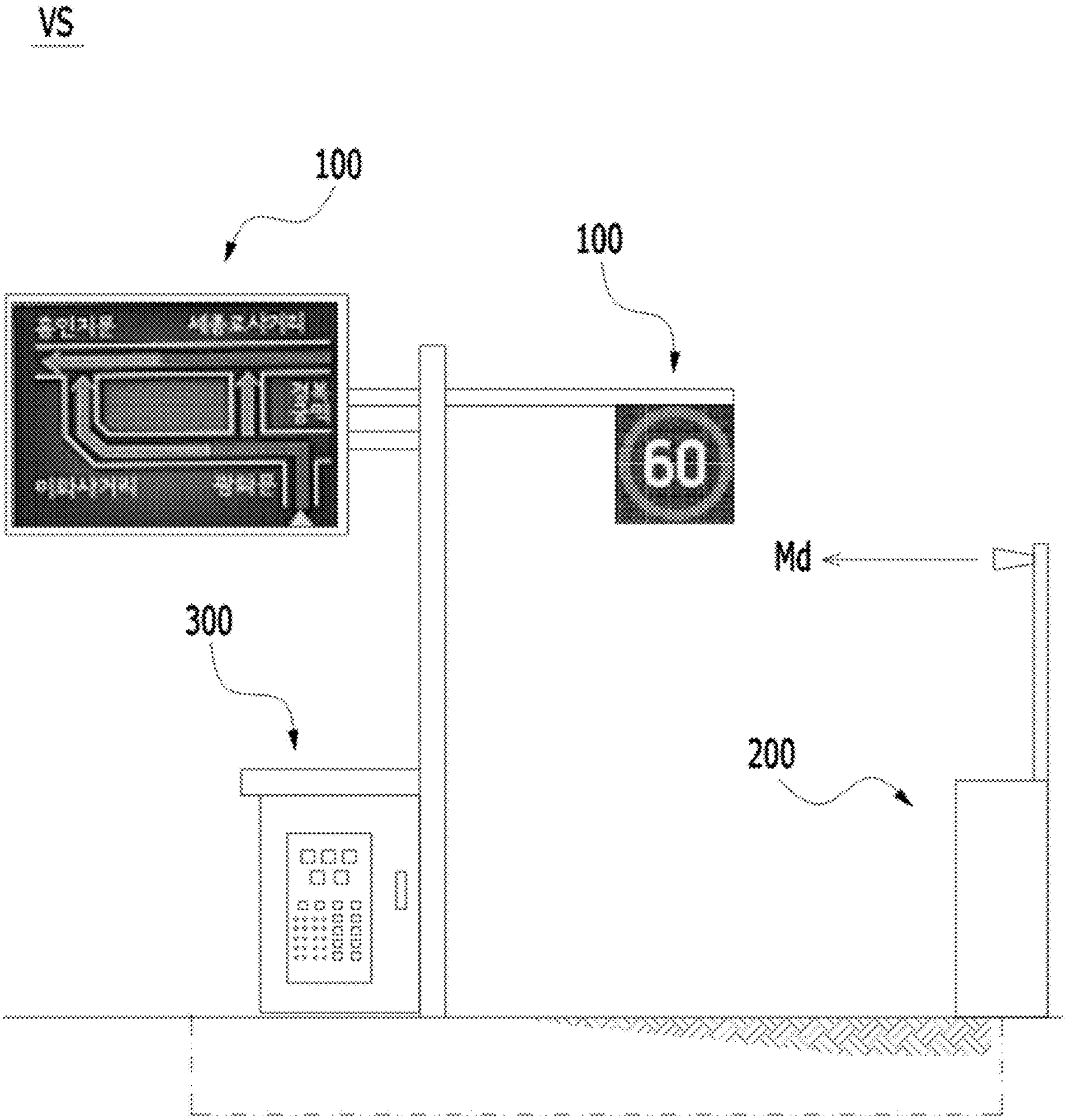
FIG. 5 is a conceptual diagram illustrating a road electric sign control system according to an embodiment of the present invention.
Figure 6:
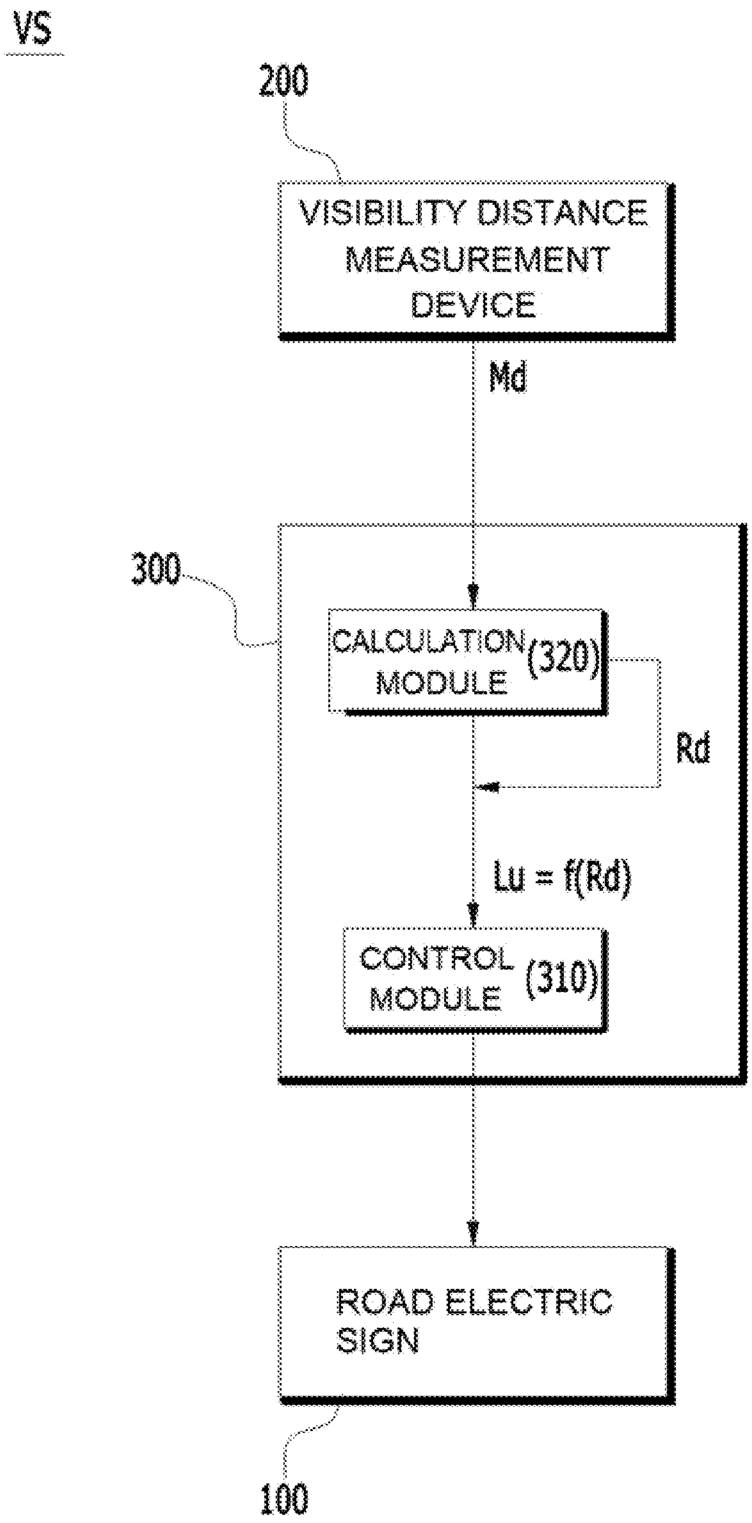
FIG. 6 is a block diagram illustrating the road electric sign control system according to an embodiment of the present invention.

As shown in FIGS. 5 and 6, the above-described road electric sign 100 displays various types of traffic information by means of the control device 300, and the present invention is mainly characterized in that the visible LED array 20 and the infrared LED array 30 of the road electric sign 100 are selectively controlled using visibility distance information (Md) measured by a visibility distance measurement device 200.

The road electric sign 100 comprises the visible LED array 20 including a plurality of visible LEDs 21 repeatedly arranged on a substrate and the infrared LED array 30 including a plurality of infrared LEDs 31 adjacent to the respective visible LEDs 21, and a description overlapping that of the above-described road electric sign 100 will be omitted.

The visibility distance measurement device 200 is installed in the vicinity of the road electric sign 100 to measure the visibility distance of the road in real time. Depending on the embodiment, the visibility distance measurement device 200 may be implemented in various ways, such as using infrared light in real time, using video images captured in real time, or using visibility distance information (Md) provided by the meteorological agency. Additionally, there may be various specific methods for measuring the visibility distance with the visibility distance measurement device 200.

An LED control module 310 of the control device 300 selectively turns on the visible LEDs 21 and the infrared LEDs 31 to display various types of traffic information on the road electric sign 100 using the visibility distance information (Md) measured by the visibility distance measurement device 200. That is, when the control device 300 selectively turns on the respective visible LEDs 21 of the visible LED array 20, the corresponding adjacent infrared LEDs 31 are also turned on.

As a result, even in the case where the driver's visibility is not sufficiently guaranteed due to adverse weather conditions, infrared light in the non-visible light range is also emitted, making it possible to capture an infrared video by capturing infrared images.

The control device 300 may be implemented in the form of a microcontroller or PLC (Programmable Logic Controller) equipped with a central processing unit, a memory, and an input/output bus. Moreover, the term "unit" or "module" as used herein refers to "a block configured to change or plug in a hardware or software system". In other words, it can be defined as a single unit or block that performs a specific function in hardware or software.

The control device 300 is preferably equipped with a communication module to transmit and receive information to and from the visibility distance measurement device 200 through a wireless communication network. However, if the visibility distance measurement device 200 is located in a short distance, a wired communication network can also be used. Various communication networks can be employed to interconnect these devices, including an intranet, wireless and wired internet, LTE, LoRa communication using sensor nodes, etc.

The LED control module 310 of the control device 300 is mainly characterized in that the respective infrared LEDs 31 of the infrared LED array 30 are synchronized and turned on only when the measured visibility distance information (Md) is less than a certain visibility distance.

In one embodiment, if a standard visibility distance is set to 300 m and the visibility distance is 100 m or more, it is determined that the driver can perceive visible light emitted by the visible LED array 30 or that an image sensor can recognize traffic information using visible light, and in this case, the turning on of the infrared LED array 30 can be omitted.

On the other hand, if the visibility distance is 300 m or less due to rain or fog, the infrared LED array 30 is controlled to be turned on along with the visible LED array 20, making it possible to provide traffic information as an effective means depending on weather conditions.

Moreover, the road electric sign 100 of the present invention may control the output of the visible LEDs 21 of the visible LED array 20 to adjust the brightness. A calculation module 320 of the control device 300 may calculate an appropriate brightness (Lu) of the respective visible LEDs 21 using the visibility distance information (Md) measured by the visibility distance measurement device 200, and the LED control module 310 may control the respective visible LEDs 21 depending on the calculated appropriate brightness (Lu) in real time.

As a result, the brightness of the visible LEDs 21 emitted according to the real-time visibility distance is continuously and variably adjusted in response to the visibility distance information (Md) of the road on which the road electric sign 100 is located, thereby ensuring the driver's visibility stably and allowing the image sensor of the driving vehicle to more clearly recognize traffic information.

Meanwhile, the spectrum-extended road electric sign control system (VS) of the present invention can be further implemented in the road electric sign 100 that functions as a variable speed limit sign. In one embodiment, the LED control module 310 of the control device 300 may display the variable speed limit ($V_t$) for the relevant road on the road electric sign 100 when the visibility distance information (Md) received from the visibility distance measurement device 200 is less than a certain visibility distance.

In other words, when the visibility distance is above a standard visibility distance, the normal speed limit ($V_o$) is displayed on the road electric sign 100, but when it is less than a certain visibility distance, the variable speed limit ($V_t$) is displayed to guide vehicles to slow down. In this case, as mentioned earlier, the control device 300 can selectively turn on the infrared LED array 30 of the road electric sign 100 based on the visibility distance information (Md).

Furthermore, the calculation module 320 of the control device 300 can calculate the deceleration distance (Rd) to extract an appropriate brightness (Lu) using the normal speed limit ($V_o$) and the variable speed limit ($V_t$) for the relevant road as represented by the following formula, and synchronize the infrared LED array 30 to be turned. In this formula, Rt represents the driver's average perception and reaction time, and a is the desired vehicle deceleration rate.

$$Rd = V_o Rt + \frac{(V_o^2 - V_t^2)}{2a}$$

For example, if the road's normal speed limit ($V_o$) is 100 km/h, the variable speed limit ($V_t$) is 50 km/h, the average perception and reaction time (Rt) is 2.5 seconds, and the deceleration rate (a) is 2 $m/s^2$, the deceleration distance (Rd) is calculated to be approximately 214 meters.

In this case, when the control device 300 of the road electric sign control system (VS) according to one embodiment of the present invention calculates an appropriate brightness (Lu) depending on the visibility distance information (Md), it can extract the appropriate brightness based on accumulated data obtained by measuring the brightness of the visible LEDs 21 for each deceleration distance (Rd) according to the visibility distance that can be recognized by a general-purpose image sensor. As a result, it is possible to provide a practical brightness that takes into account both the driver's perception and reaction and the image sensor's recognition, and the accumulated data can be updated periodically.

According to empirical experiments, it has been found that the appropriate brightness (Lu, Lu=f(Rd)) according to the deceleration distance (Rd) for each visibility distance shows a linear correlation, and through regression analysis, the following equations for each visibility distance range have been determined as shown in Table 1:

TABLE 1

| Visibility distance (m) | Equations for appropriate brightness (Lu) |
|---|---|
| 30 ≤ Md < 50 | Lu(cd/$m^2$) = 1064.2 × Rd − 33826 |
| 100 ≤ Md < 100 | Lu(cd/$m^2$) = 1107.6 × Rd − 55359 |
| 100 ≤ Md | Lu(cd/$m^2$) = 435.94 × Rd − 32375 |

Figure 7:
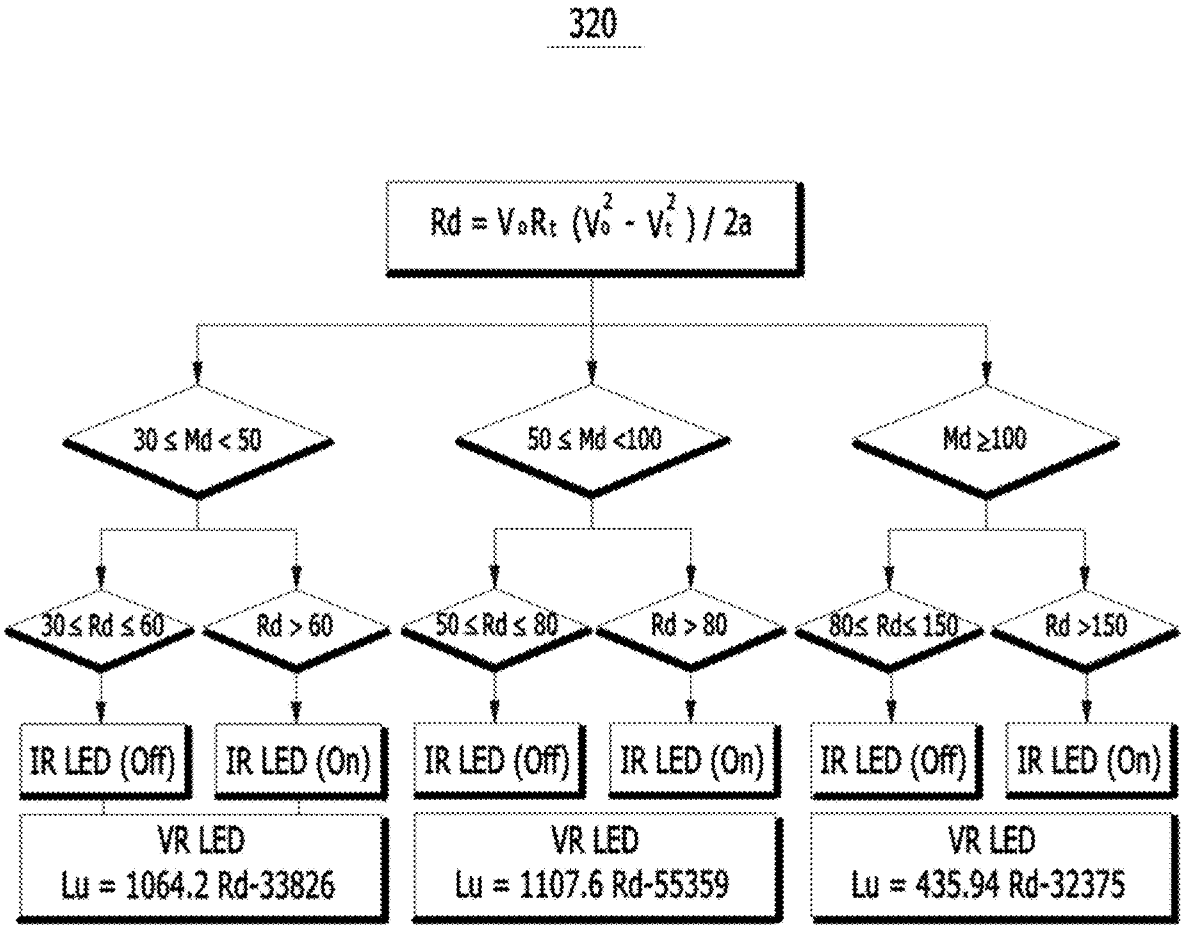
FIG. 7 is a block diagram illustrating the algorithm of the road electric sign control system according to an embodiment of the present invention.

In particular, the calculation module 320 of the control device 300 determines and controls the appropriate brightness (Lu) and the turning on of the infrared LED array 30 based on the measured visibility distance information (Md) and the pre-stored or calculated deceleration distance (Rd) as shown in the flowchart shown in FIG. 7. In other words, the turning on of the infrared LED array 30 can be determined based on accumulated data obtained by measuring the deceleration distance (Rd) according to the visibility distance that can be recognized by a general-purpose image sensor.

For example, if the visibility distance information (Md) is 70 m, the road's normal speed limit ($V_o$) is 80 km/h, the variable speed limit ($V_t$) is 40 km/h, the average perception and reaction time (Rt) is 2.5 seconds, and the deceleration rate (a) is 2 $m/s^2$, the calculation module 320 calculates the deceleration distance (Rd) as approximately 148 m. Therefore, the calculation module 320 calculates the appropriate brightness (Lu) as 3,603 (cd/$m^2$) and determines to omit the turning on of the infrared LED array 30 since the deceleration distance (Rd) is less than 150 m.

Subsequently, the control module 310 symbolizes the traffic information about the variable speed limit at a brightness of 3,603 (cd/$m^2$) by means of the respective visible LEDs 21 based on the calculation result from the calculation module 320 and omits the turning on of the respective infrared LEDs 31.

In another embodiment, if the visibility distance information (Md) is 70 m, the road's normal speed limit ($V_o$) is 1000 km/h and the variable speed limit ($V_t$) is 50 km/h, the calculation module 320 calculates the deceleration distance (Rd) as approximately 214 m. Therefore, the calculation module 320 calculates the appropriate brightness (Lu) as 6,0916 (cd/m$^2$) and determines to omit the turning on of the infrared LED array 30 since the deceleration distance (Rd) exceeds 80 m.

Subsequently, the control module 310 symbolizes the traffic information about the variable speed limit at a brightness of 6,0916 (cd/m$^2$) by means of the respective visible LEDs 21 based on the calculation result from the calculation module 320 and also turns on the respective infrared LEDs 31 adjacent to the respective visible LEDs 21.

The above-described algorithm illustrates a control method according to an embodiment of the control device 300. It is not limited to the specific formulae or relationships shown in FIG. 7 and can be adapted based on accumulated data and empirical experiments.

Next, an embodiment of the traffic information acquisition device (A) for use of the extended-spectrum road electric sign of the present invention will be described in more detail.

Figure 8:
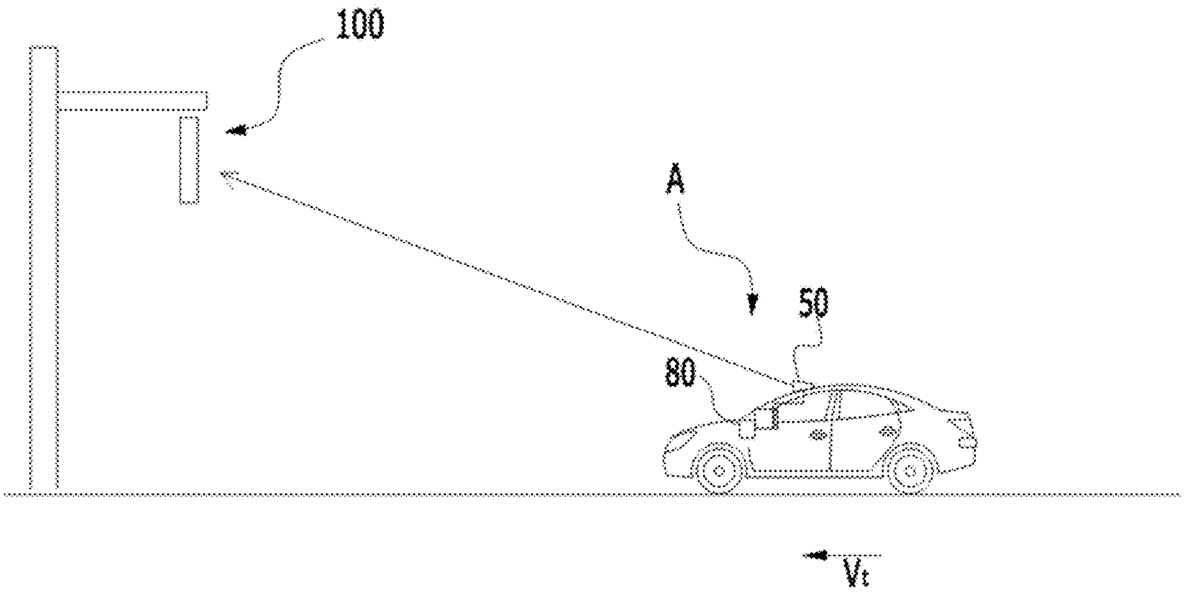
FIG. 8 is a conceptual diagram illustrating a traffic information acquisition device according to an embodiment of the present invention.
Figure 9:
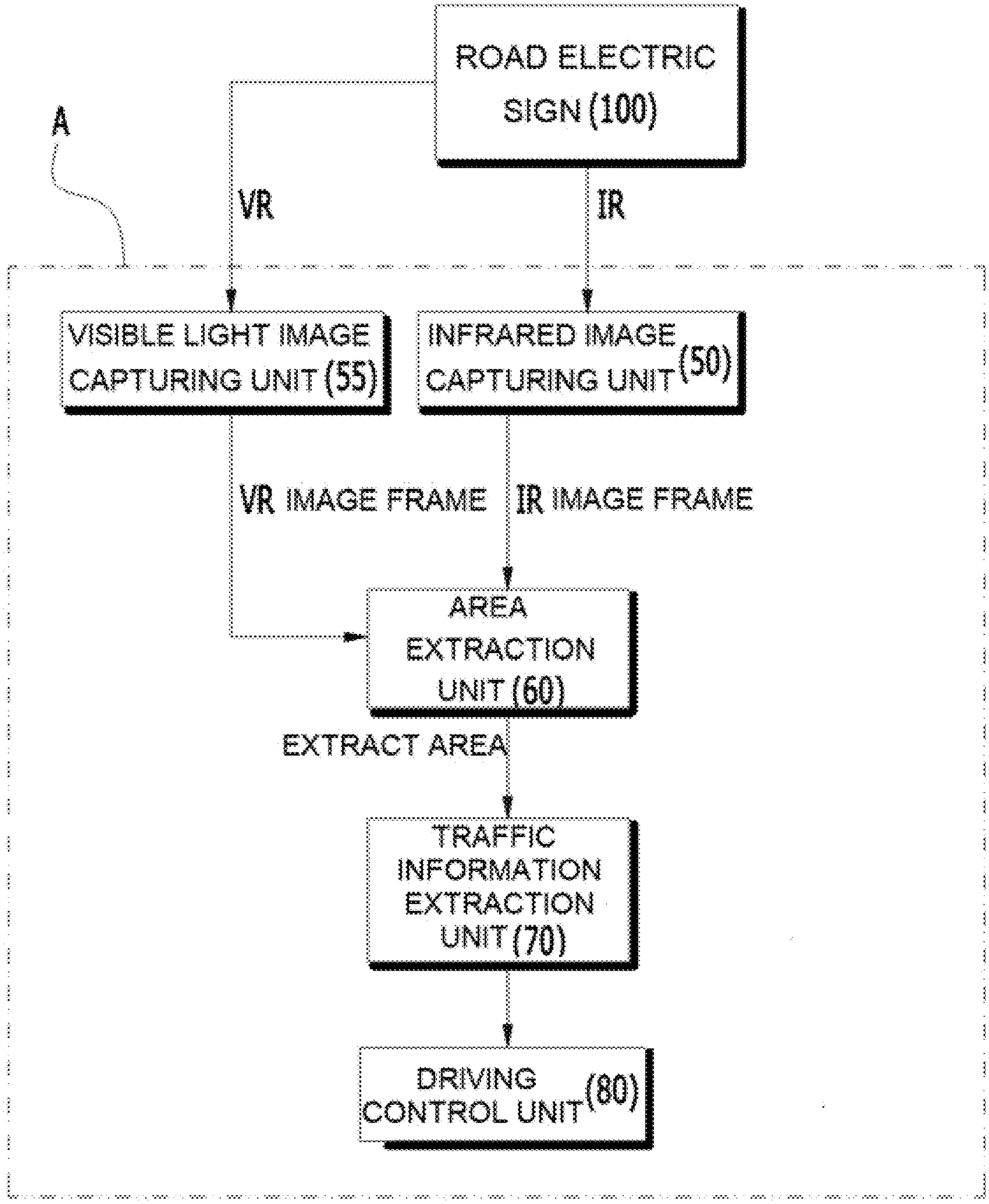
FIG. 9 is a block diagram illustrating the traffic information acquisition device according to an embodiment of the present invention.

As shown in FIGS. 8 and 9, the traffic information acquisition device (A) of the present invention is provided to identify various types of traffic information displayed on the road electric sign 100 equipped with the infrared LED array 30 and control the vehicle as described above. The traffic information acquisition device (A) comprises an infrared image capturing unit 50, an area extraction unit 60, a traffic information extraction unit 70, and a driving control unit 80. Therefore, the traffic information acquisition device (A) can be defined as a device that is mounted on a moving vehicle.

First, the infrared image capturing unit 50 is a camera module that captures an infrared image by recognizing infrared light from infrared LEDs 31 of the road electric sign 100. The infrared image capturing unit 50 may be implemented as part of the sensor equipment of an Advanced Driver Assistant System (ADAS) that controls the steering system by recognizing the surrounding environment by means of the vehicle's cameras and sensors. That is, it can be manufactured as a dual type with a camera 55 that captures visible light images.

The area extraction unit 60 identifies an electric sign area using the image captured by the infrared image capturing unit 50. The area extraction unit 60 divides the frame of the image captured by the infrared image capturing unit 50 into area units and identifies and extracts only the area corresponding to the road electric sign 100 from the divided areas.

Figure 10A:
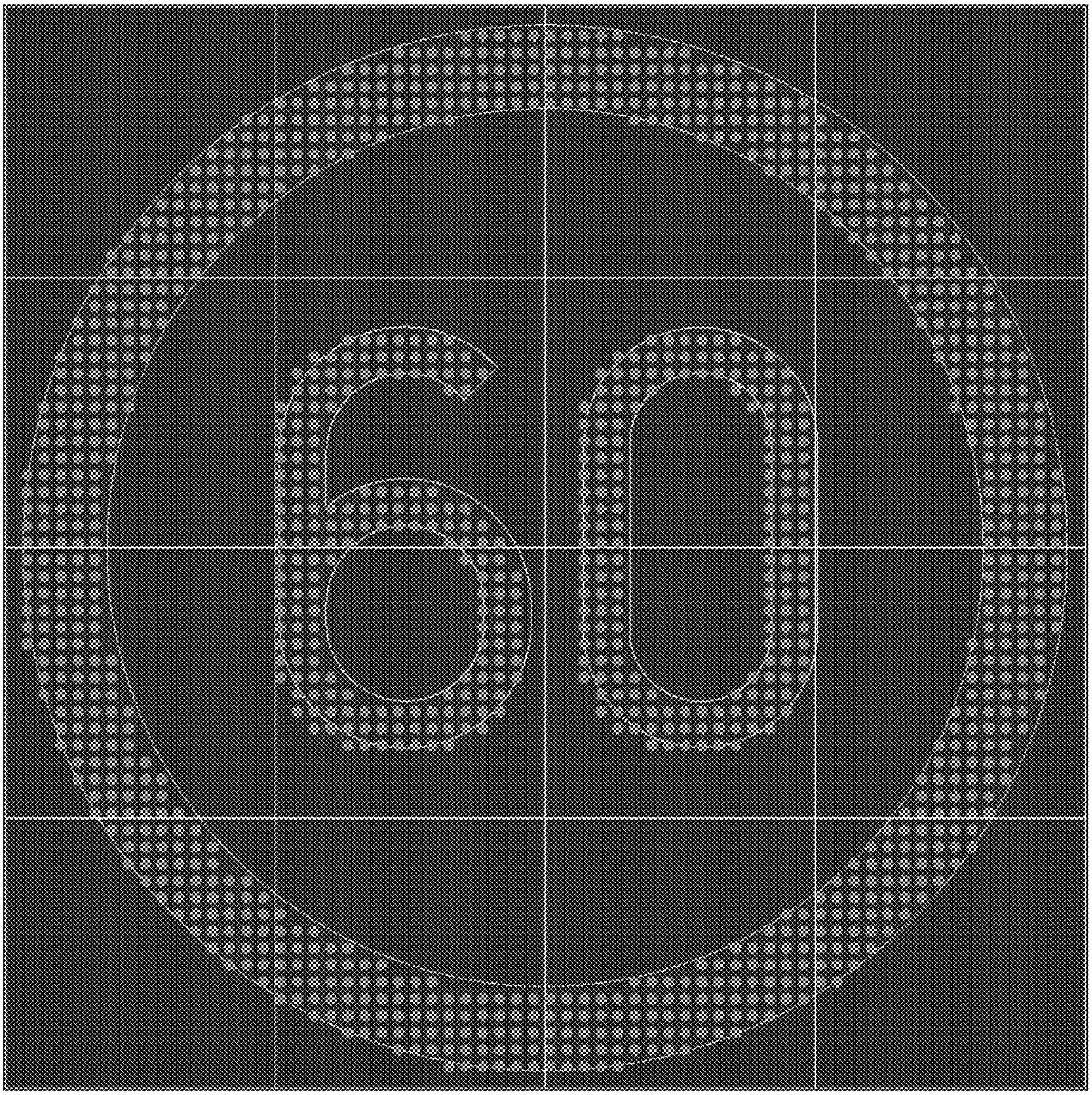
FIGS. 10A to 10C show images conceptually illustrating traffic information extracted by the traffic information acquisition device according to various embodiments of the present invention.

The traffic information extraction unit 70 extracts traffic information based on the electric sign area identified by the area extraction unit 60. FIG. 10A conceptually illustrates the principle by which the traffic information extraction unit 70 extracts traffic information from the electric sign area. The traffic information extraction unit 70 can extract highly accurate traffic information by performing repeated machine learning using accumulated data on infrared images.

Figure 10B:
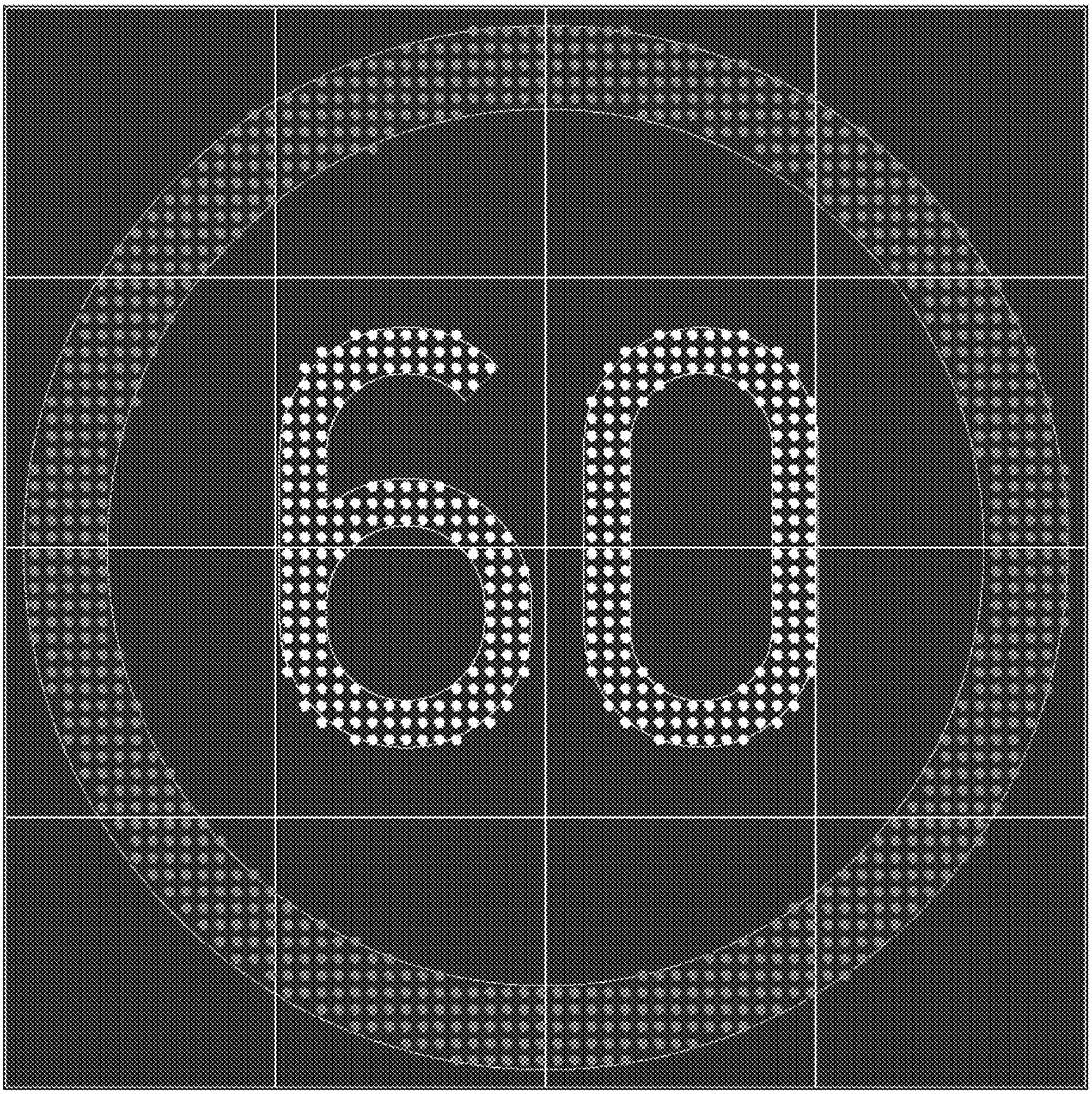
Figure 10C:
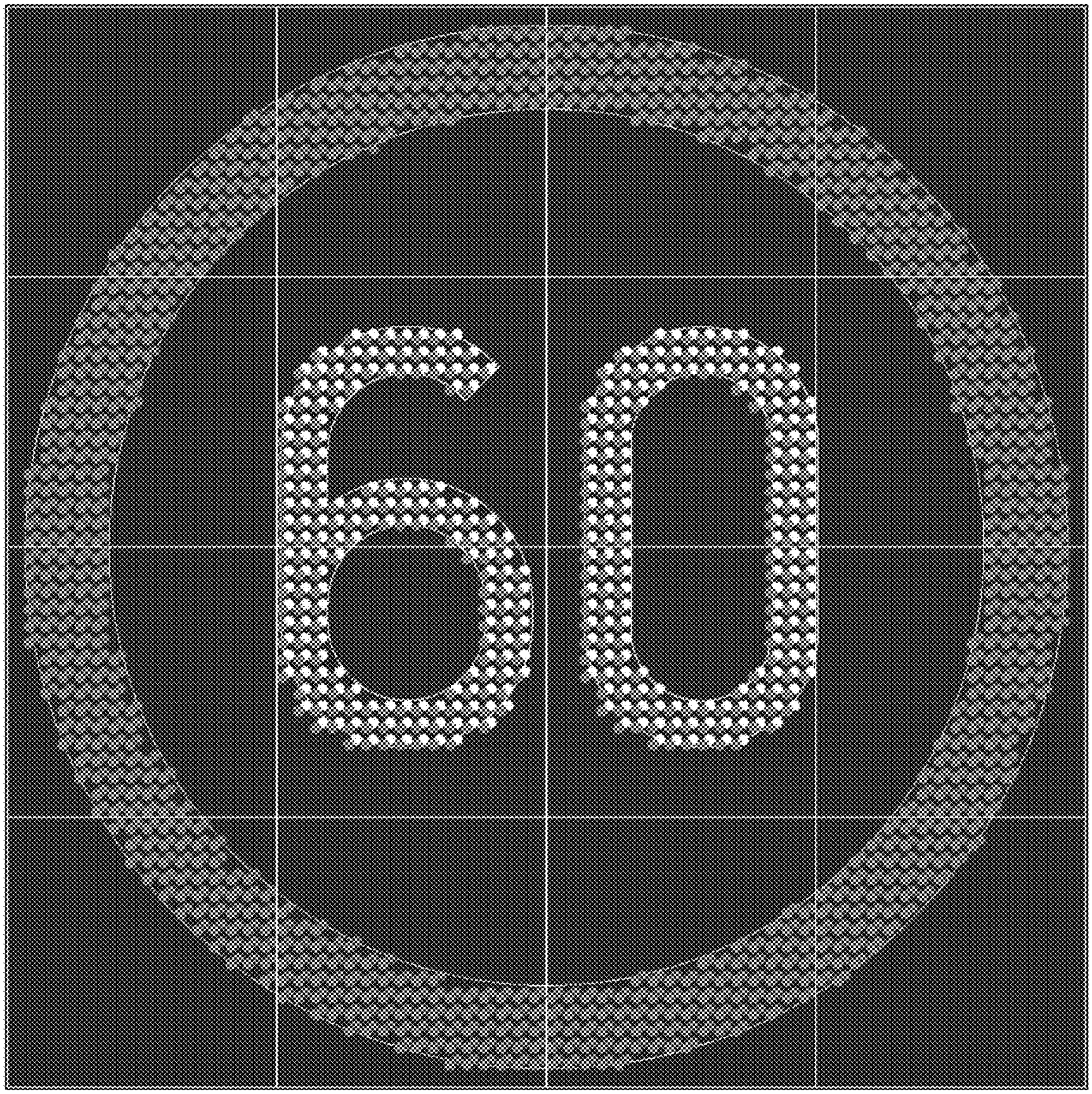

Moreover, the area extraction unit 60 and the traffic information extraction unit 70 can identify the electric sign area and extract traffic information using the images captured by the visible light camera 55. FIG. 10B conceptually illustrates the principle by which the traffic information extraction unit 70 extracts traffic information using the images captured by the visible light camera 55. Furthermore, the traffic information extraction unit 70 may combine infrared images and visible light images captured by a dual-type camera to extract traffic information as shown in FIG. 10C.

The driving control unit 80 controls the driving of the vehicle based on the traffic information extracted by the traffic information extraction unit 70. Furthermore, it may be implemented as a control device in the Advanced Driver Assistant System (ADAS) to immediately recognize real-time traffic information, such as speed limits, road conditions, weather conditions, accidents, etc., and reflect the traffic information in autonomous driving.

It will be appreciated by those skilled in the art to which the present invention pertains that the spectrum-expanded road electric sign 100, the road electric sign control system (VS) and the traffic information acquisition device (A) using the same according to the present invention as described above can be implemented in other specific forms without changing the technical spirit or essential features of the present invention.

Therefore, the embodiments described above should be understood as illustrative in all aspects, instead of limiting. The scope of the present disclosure is defined not by the detailed description, but by the appended claims and their equivalents, and the meaning and scope of the claims and all changes or modifications derived from their equivalents should be construed as being included in the scope of the present disclosure.

| Brief Description of Reference Numerals | |
|---|---|
| VS: spectrum-extended road electric sign | |
| 100: spectrum-extended road electric sign | |
| 10: housing | |
| 20: visible LED array | 21: visible LED |
| 30: infrared LED array | 31: infrared LED |
| 40: cover lens | 41, 42: lens sleeves |
| 200: visibility distance measurement device | |
| 300: control device | |
| 310: control module | 320: calculation module |
| A: traffic information acquisition device | |
| 50: infrared image capturing unit | |
| 60: area extraction unit | |
| 70: traffic information extraction unit | |
| 80: driving control unit | |

What is claimed is:

1. A spectrum-extended road electric sign control system comprising:

a road electric sign (100) including a visible LED array (20) including a plurality of visible LEDs (21) repeatedly arranged on a substrate and an infrared LED array (30) including a plurality of infrared LEDs (31) repeatedly arranged to be adjacent to the respective visible LEDs (21);

a visibility distance measurement device (200) configured to measure a visibility distance of a road in real time; and a control device (300) that selectively turns on the visible LEDs (21) and the infrared LEDs (31) to display various types of traffic information on the road electric sign (100) using visibility distance information (Md) measured by the visibility distance measurement device (200).

2. A spectrum-extended road electric sign control system of claim 1, wherein the control device (300) synchronizes the infrared LED array (30) to be turned on only when the visibility distance information (Md) is less than a certain visibility distance.

3. A spectrum-extended road electric sign control system of claim 2, wherein the control device (300) calculates an appropriate brightness (Lu) of the respective visible LEDs (21) using the visibility distance information (Md) and then controls the visible LEDs (21) in real time.

4. A spectrum-extended road electric sign control system of claim 3, wherein the control device (300) displays a variable speed limit ($V_t$) for the relevant road on the road electric sign (100) when the visibility distance information (Md) is less than a certain visibility distance.

5. A spectrum-extended road electric sign control system of claim 4, wherein the control device (300) calculates a deceleration distance (Rd) using a normal speed limit ($V_o$) and the variable speed limit ($V_t$) for the relevant road, and synchronizes the infrared LED array (30) to be turned on only when the deceleration distance (Rd) is more than a certain distance.

* * * * *